US011244214B2

(12) United States Patent
Tsuji (10) Patent No.: US 11,244,214 B2
(45) Date of Patent: Feb. 8, 2022

(54) IMAGE FORMING APPARATUS, IMAGE FORMING METHOD, AND COMPUTER-READABLE NON-TEMPORARY RECORDING MEDIUM STORING IMAGE FORMING PROGRAM

(71) Applicant: KYOCERA Document Solutions Inc., Osaka (JP)

(72) Inventor: Yuka Tsuji, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/203,985

(22) Filed: Mar. 17, 2021

(65) Prior Publication Data
US 2021/0295122 A1 Sep. 23, 2021

(30) Foreign Application Priority Data
Mar. 18, 2020 (JP) .............................. JP2020-048198

(51) Int. Cl.
*G06K 15/02* (2006.01)
*G06F 3/12* (2006.01)
*G06K 15/12* (2006.01)

(52) U.S. Cl.
CPC ....... *G06K 15/1878* (2013.01); *G06F 3/1208* (2013.01); *G06F 3/1256* (2013.01); *G06K 15/129* (2013.01)

(58) Field of Classification Search
CPC .............. G06K 15/1878; G06K 15/129; G06F 3/1208; G06F 3/1256

USPC ................................ 358/1.9, 1.15, 518, 448
See application file for complete search history.

(56) References Cited

U.S. PATENT DOCUMENTS

| 8,400,677 | B2 * | 3/2013 | Sakamoto | ............ | H04N 1/6036 |
| | | | | | 358/1.9 |
| 2011/0310446 | A1 * | 12/2011 | Komatsu | .............. | H04N 1/6088 |
| | | | | | 358/518 |

FOREIGN PATENT DOCUMENTS

JP          2008-067029          3/2008

* cited by examiner

*Primary Examiner* — Quang N Vo
(74) *Attorney, Agent, or Firm* — Lex IP Meister, PLLC (57) ABSTRACT

The image forming apparatus includes a color conversion processing unit that has an input profile for color conversion to first image data which is image data of a device-independent color space, and an adjustment target profile for color conversion to second image data which represents gradation values of the plurality of color materials, and a simulation profile for color-converting the second image data to third image data of the device-independent color space, a profile adjustment unit that adjusts the adjustment target profile in accordance with the user input, determines whether or not a color difference before and after the adjustment of the adjustment target profile is smaller than a preset threshold value, and updates the adjustment target profile by using the adjustment target profile after the adjustment when the profile adjustment unit determines that the color difference is smaller than the threshold value, and a color difference calculation unit.

7 Claims, 6 Drawing Sheets

PRINTED MATTER BEFORE ADJUSTMENT

FIG. 4B

AREA SPECIFICATION PROCESS

FIG. 4C

PRINTED IMAGE BEFORE AND AFTER ADJUSTMENT

FIG. 5

IMAGE FORMING APPARATUS, IMAGE FORMING METHOD, AND COMPUTER-READABLE NON-TEMPORARY RECORDING MEDIUM STORING IMAGE FORMING PROGRAM

INCORPORATION BY REFERENCE

This application is based upon, and claims the benefit of priority from, corresponding Japanese Patent Application No. 2020-048198 filed in the Japan Patent Office on Mar. 18, 2020, the entire contents of which are incorporated herein by reference.

BACKGROUND

Field of the Invention

The present disclosure relates to an image forming apparatus, an image forming method, and a computer-readable non-temporary recording medium storing an image forming program, and particularly to a color conversion processing technique.

Description of Related Art

An image forming apparatus generally performs color conversion by using an output profile in order to reproduce an image by using a plurality of color materials (for example, CMYK color materials) including a plurality of chromatic color materials. The output profile defines a color space that can be reproduced by subtractive color mixing of color materials in an image forming apparatus. For example, in color reproduction using CMYK color materials, a plurality of CMYK combinations may be able to be used to reproduce visually substantially the same color, for example, color having substantially the same Lab value.

SUMMARY

The present disclosure provides an image forming apparatus that forms an image on an image forming medium by using a plurality of coloring materials. The image forming apparatus includes a color conversion processing unit, a profile adjustment unit, an image forming unit, and a color difference calculation unit. The color conversion processing unit has an input profile for color conversion to first image data which is image data of a device-independent color space, and an adjustment target profile for color conversion to second image data which represents gradation values of the plurality of color materials, and a simulation profile for color-converting the second image data to third image data of the device-independent color space, and performs a color conversion process. The profile adjustment unit accepts user input representing adjustment content of the adjustment target profile, adjusts the adjustment target profile in accordance with the user input, determines whether or not a color difference before and after the adjustment of the adjustment target profile is smaller than a preset threshold value, and updates the adjustment target profile by using the adjustment target profile after the adjustment when the profile adjustment unit determines that the color difference is smaller than the threshold value. The image forming unit forms an image on an image forming medium by using the plurality of coloring materials on the basis of the second image data. The color difference calculation unit generates adjusted image data which is image data color-converted by using the adjustment target profile after the adjustment, color-converts the adjusted image data by using the simulation profile to generate the third image data, and calculates the color difference as a difference in color before and after the adjustment of the adjustment target profile on the basis of the third image data.

The present disclosure provides an image forming method for forming an image on an image forming medium by using a plurality of coloring materials. The image forming method includes a color conversion process, a profile adjustment process, an image forming process, and a color difference calculation process. In the color conversion process, an input profile for color conversion to first image data, which is image data of a device-independent color space, and an adjustment target profile for color conversion to second image data which represents gradation values of the plurality of color materials, and a simulation profile for color-converting the second image data to third image data of the device-independent color space are provided, and a color conversion process is performed. In the profile adjustment process, user input representing adjustment content of the adjustment target profile is accepted, the adjustment target profile is adjusted in accordance with the user input, it is determined whether or not a color difference before and after the adjustment of the adjustment target profile is smaller than a preset threshold value, and the adjustment target profile is updated by using the adjustment target profile after the adjustment when it is determined that the color difference is smaller than the threshold value. In the image forming process, an image is formed on an image forming medium by using the plurality of coloring materials on the basis of the second image data. In the color difference calculation process, adjusted image data which is image data color-converted by using the adjustment target profile after the adjustment is generated, the third image data is generated by color-converting the adjusted image data by using the simulation profile, and the color difference is calculated as a difference in color before and after the adjustment of the adjustment target profile on the basis of the third image data.

The present disclosure provides a computer-readable non-temporary recording medium storing an image-forming program that controls an image forming apparatus which forms an image on an image forming medium by using a plurality of coloring materials. The image forming program causes the image forming apparatus to function as a color conversion processing unit, a profile adjustment unit, an image forming unit, and a color difference calculation unit. The color conversion processing unit has an input profile for color conversion to first image data which is image data of a device-independent color space, and an adjustment target profile for color conversion to second image data which represents gradation values of the plurality of color materials, and a simulation profile for color-converting the second image data to third image data of the device-independent color space, and performs a color conversion process. The profile adjustment unit accepts user input representing an adjustment content of the adjustment target profile, adjusts the adjustment target profile in accordance with the user input, determines whether or not a color difference before and after the adjustment of the adjustment target profile is smaller than a preset threshold value, and updates the adjustment target profile by using the adjustment target profile after the adjustment when the profile adjustment unit determines that the color difference is smaller than the threshold value. The image forming unit forms an image on an image forming medium by using the plurality of coloring materials on the basis of the second image data. The color difference calculation unit generates adjusted image data which is image data color-converted by using the adjustment target profile after the adjustment, color-converts the adjusted image data by using the simulation profile to generate the third image data, and calculates the color difference as a difference in color before and after the adjustment of the adjustment target profile on the basis of the third image data.

DETAILED DESCRIPTION

Hereinafter, an mode (hereinafter referred to as an "embodiment") for carrying out the present disclosure will be described with reference to the accompanying drawings.

Figure 1:
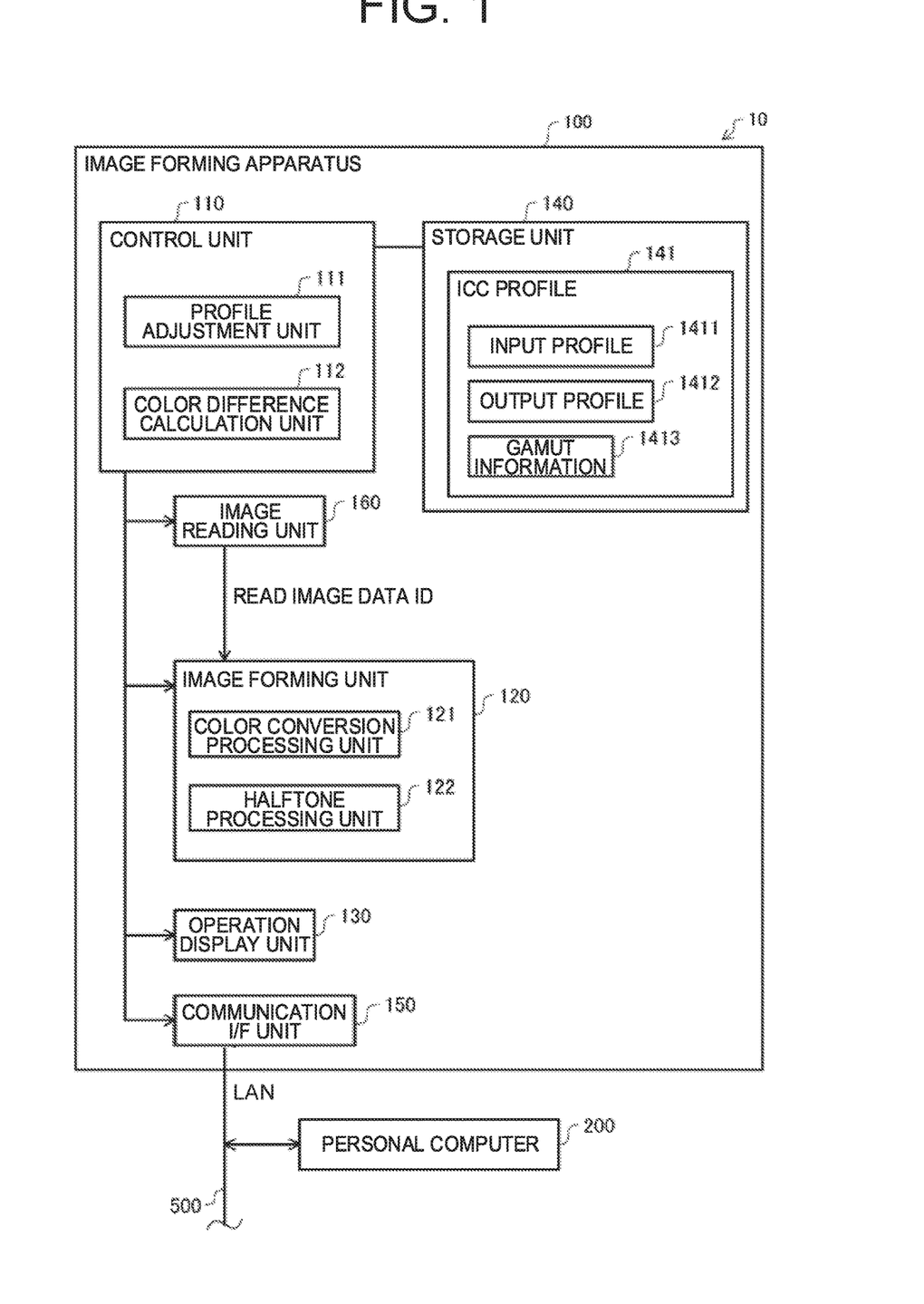
FIG. 1 is a schematic configuration diagram illustrating an overall configuration of an image forming system according to an embodiment of the present disclosure.

FIG. 1 is a schematic configuration diagram illustrating the overall configuration of an image forming system 10 according to the embodiment of the present disclosure. The image forming system 10 includes an image forming apparatus 100, a personal computer 200, and a local area network (also simply called a LAN) 500 that connects the image forming apparatus 100 and the personal computer 200.

The image forming apparatus 100 includes a control unit 110, an image forming unit 120, an operation display unit 130, a storage unit 140, and a communication interface unit 150 (also called a communication I/F), and an image reading unit 160. The image forming unit 120 includes a color conversion processing unit 121 and a halftone processing unit 122. The image reading unit 160 reads an image from an original, generates a read image data ID which is RGB image data, and transmits the read image data ID to the image forming unit 120. The RGB image data is device-dependent (depending on the image reading unit 160) image data. The image forming apparatus 100 is connected to the personal computer 200 via the communication interface unit 150.

The control unit 110 includes a main storage means such as a RAM and a ROM, and a control means such as an MPU (Micro Processing Unit) and a CPU (Central Processing Unit). In addition, the control unit 110 has a controller function related to interfaces such as various I/O, a USB (universal serial bus), a bus, and other hardware, and controls the entire image forming apparatus 100. The control unit 110 has a profile adjustment unit 111 and a color difference calculation unit 112. The functions of the profile adjustment unit 111 and the color difference calculation unit 112 will be described later.

The storage unit 140 is a storage device composed of a hard disk drive, a flash memory, and the like which are each a non-temporary recording medium, and stores an image forming program and data performed by the control unit 110, and the like. The storage unit 140 stores a color conversion table (also called an ICC profile) 141. The color conversion table 141 includes an input profile 1411, an output profile 1412, a gamut information 1413, and a device link profile (not illustrated). The input profile 1411, the output profile 1412, and the device link profile are all configured as LUTs (Look Up Tables).

The image reading unit 160 has the characteristics defined by the input profile 1411. When the input profile 1411 is used, the read image data ID which is device-dependent RGB image data can be converted to Lab image data (also called first image data) which is image data of a Lab color space which is a device-independent color space. Consequently, the image forming apparatus 100 can convert the read image data to, for example, sRGB image data via the Lab color space, and output the sRGB image data as scan data.

The image forming unit 120 has the characteristics defined by the output profile 1412. When the output profile 1412 is used, the Lab image data is converted to CMYK image data which is image data of a CMYK color space. The CMYK image data is image data (also called second image data) that represents gradation values of a plurality of color materials (CMYK toner or CMYK ink in this example) that can be used by the image forming unit 120. The characteristics of the image forming unit 120 can be simulated by a simulation profile. When the simulation profile is used, the CMYK image data can be converted to the Lab image data. The lab image data that is color-converted from the CMYK image data by using the simulation profile is also called third image data.

The image forming apparatus 100 has a device link profile that is a combination of the input profile 1411 and the output profile 1412. The device link profile can reduce the burden of a color conversion process, and improve the printing speed, in a copying process. The gamut information 1413 includes data for determining whether or not the image data is within a color gamut range reproducible by the image forming unit 120.

The output profile 1412 and the simulation profile are irreversible. That is, when the Lab image data which is the image data is converted to the CMYK image data by using the output profile 1412, and the CMYK image data is converted to the Lab image data by using the simulation profile, a color difference ΔE is caused between the Lab image data before and after the conversion due to the characteristics of the image forming unit 120. This point is the same as the device link profile.

The color conversion processing unit 121 converts the RGB image data by using the device link profile to generate the CMYK image data at the time of copying. The CMYK image data is device-dependent (depending on the image forming unit 120) image data for reproducing an image with the CMYK color materials available in the image forming unit 120. The image forming unit 120 performs a RIP process to the CMYK image data by the halftone processing unit 122 to generate dot data which is bit map data. The dot data is data that represents the formation state of dots formed by the ink of CMYK. The color materials are not limited to CMYK, and may be a plurality of other color materials (for example, CMYKlclm, CMYK+Orange+Green, or the like).

The image forming unit 120 forms an image on printing paper (not illustrated) on the basis of the dot data, and ejects the image. In this example, it is assumed that the image is formed on the printing paper (not illustrated) on the basis of a print job received from the personal computer 200, and ejected. The dot data is bit map data that represents the formation state of dots on printing paper. The printing paper is also called an image forming medium.

The operation display unit 130 has characteristics defined by a monitor profile, and accepts operation input (simply called user input) of a user from a display (not illustrated) or various buttons or switches (not illustrated) that function as a touch panel.

Figure 2:
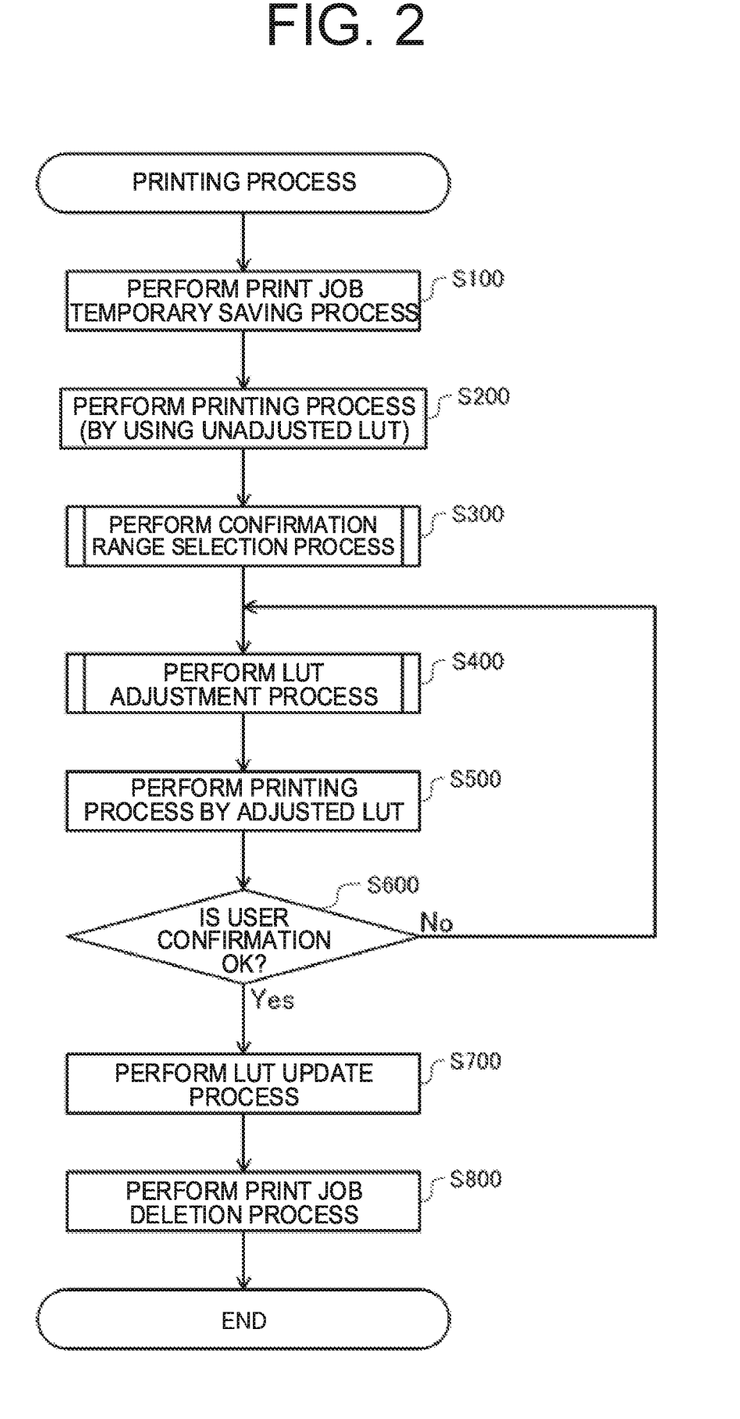
FIG. 2 is a flowchart illustrating the contents of a printing process according to the embodiment.

FIG. 2 is a flowchart illustrating the contents of a printing process according to the embodiment. This printing process is started in response to the reception of a print job in which a preset color adjustment mode is selected. The image forming apparatus 100 analyzes the print job and determines whether or not the print job is set to the color adjustment mode, in response to the reception of the print job. The color adjustment mode can also be set via the operation display unit (not illustrated) of the image forming apparatus 100, for example, in the copying process.

In Step S100, the image forming apparatus 100 performs a print job temporary saving process in response to the reception of the print job. In the print job temporary saving process, the control unit 110 saves the print job in a hard disk drive (not illustrated). The print job includes image data that represents a desired print target image that becomes a print target generated by selecting, for example, any of sRGB, Adobe RGB, and CMYK (such as Japan Color 2001 Coated) as a work color space in advance by using a graphic software, in the personal computer 200.

In this example, it is assumed that the work is performed by using test CMYK image data included in the print job. In this case, the personal computer 200 converts the CMYK image data as input image data representing the desired print target image, and displays the converted image data on a display (not illustrated).

In Step S200, the image forming unit 120 performs the printing process by using the device link profile (LUT). In this printing process, the color conversion processing unit 121 performs color conversion to the test CMYK image data by using the device link profile, and generates color-converted C'M'Y'K' image data. The halftone processing unit 122 performs a RIP process to the C'M'Y'K' image data to generate the dot data which is the bit map data. The image forming unit 120 forms an image on printing paper (not illustrated) on the basis of the dot data and outputs the image as a printed matter P1 (described later).

In Step S300, the control unit 110 performs a confirmation range selection process. The confirmation range selection process is a process of selecting a range for confirming color reproduction and a dot formation state before and after the adjustment of the device link profile (LUT). In the confirmation range selection process, it is also possible to select the range that reproduces the color to be adjusted by the LUT.

Figure 3:
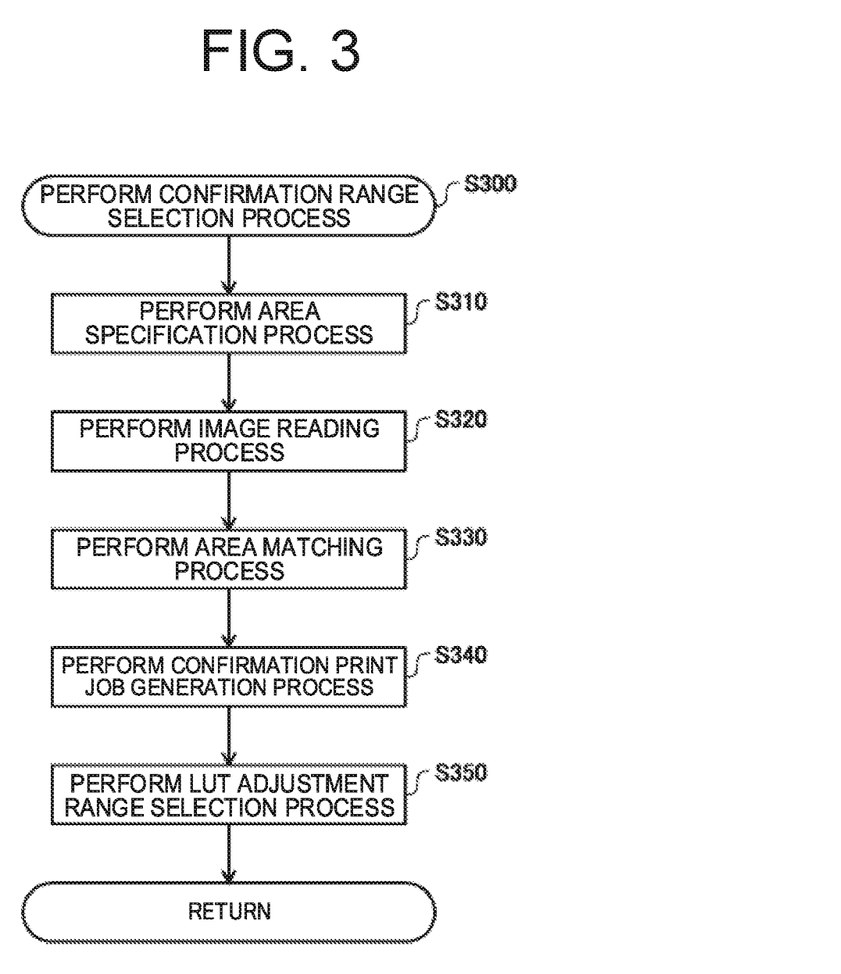
FIG. 3 is a flowchart illustrating the contents of a confirmation range selection process according to the embodiment.
Figure 4A:
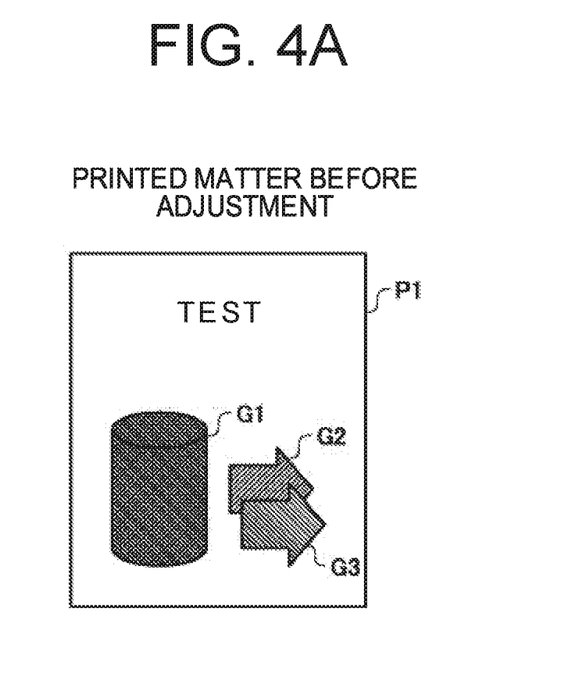
FIGS. 4A, 4B and 4C are each an explanatory diagram illustrating the contents of the confirmation range selection process according to the embodiment.
Figure 4B:
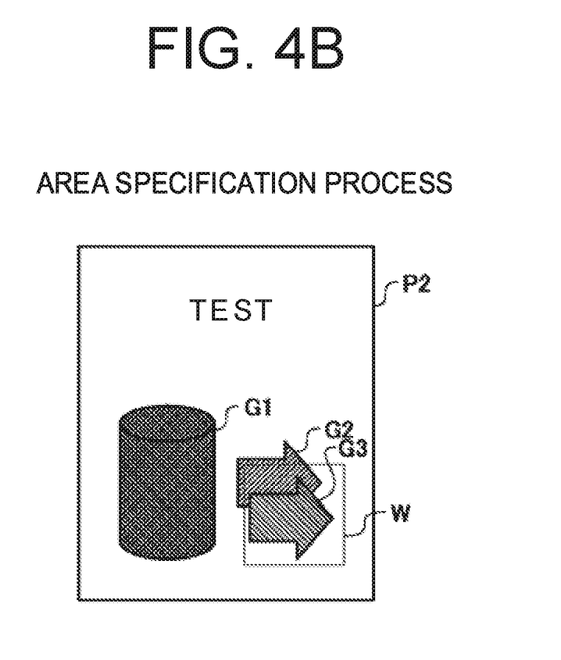
Figure 4C:
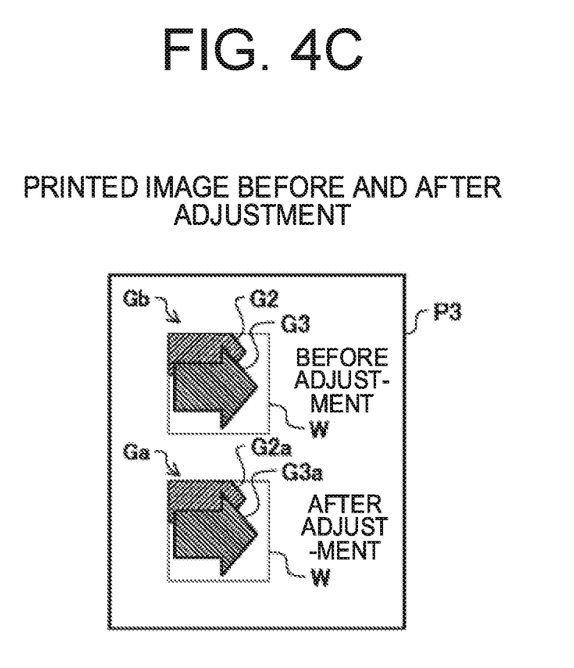

FIG. 3 is a flowchart illustrating the contents of the confirmation range selection process according to the embodiment. FIGS. 4A to 4C are each an explanatory diagram illustrating the contents of the confirmation range selection process according to the embodiment. FIG. 4A illustrates the printed matter P1 output by the printing process (Step S200). Three image objects G1, G2 and G3 are displayed on the printed matter P1 (image for area selection).

In Step S310, a user performs an area specification process. In the area designation process, the user manually specifies an area, which becomes a confirmation range selection target, on the printed matter P1 output from the image forming apparatus 100. FIG. 4B illustrates a printed matter P2 after the area designation process (Step S310). A handwritten window W to be used to select the confirmation range is displayed on the printed matter P2. In this example, the window W is drawn on the printed matter P1 as a square border (an example of a range selection image) drawn with a writing tool using a ruler, and constitutes a part of an image of the printed matter P2.

In Step S320, the user performs an image reading process. In the image scanning process, the user scans the image of the printed matter P2 by using the image reading unit 160, and generates the read image data ID. In this example, the profile adjustment unit 111 can detect the window W by analyzing a difference between an image represented by the read image data ID and an image represented by the image data of the print job being temporarily saved.

In Step S330, the profile adjustment unit 111 performs an area matching process. In the area matching process, the profile adjustment unit 111 identifies and extracts an image area (image range) having substantially the same image as the image of the image area surrounded by the window W in the image of the printed matter P2 in the image represented by the image data of the print job, for example, by pattern matching.

In Step S340, the profile adjustment unit 111 performs a confirmation print job generation process. In the confirmation print job generation process, the profile adjustment unit 111 processes the image data of the print job that is being temporarily saved, and generates a print job for reproducing a printed image having a plurality of the images (the image Gb and the image Ga in this example) with the images G2 and G3 surrounded by the window W as objects in one print image.

In Step S350, the profile adjustment unit 111 performs an LUT adjustment range selection process. In the LUT adjustment range selection process, the profile adjustment unit 111 inquires the user via the operation display unit 130 whether the process is performed in a processing mode of limiting the LUT adjustment range to the color of the image area surrounded by the window W, or LUT or in a processing mode of setting the LUT adjustment range to the color of the entire range of the LUT, and sets the LUT adjustment range to one of the processing modes in accordance with user input. In this example, it is assumed that the user performs input for limiting the LUT adjustment range to the color of the image area surrounded by the window W.

In Step S400, the profile adjustment unit 111 performs the LUT adjustment process. In the LUT adjustment process, the profile adjustment unit 111 can improve the formation state of dot (for example, graininess) with almost no effect on color reproduction. In this example, the device link profile (LUT) is adjusted.

Figure 5:
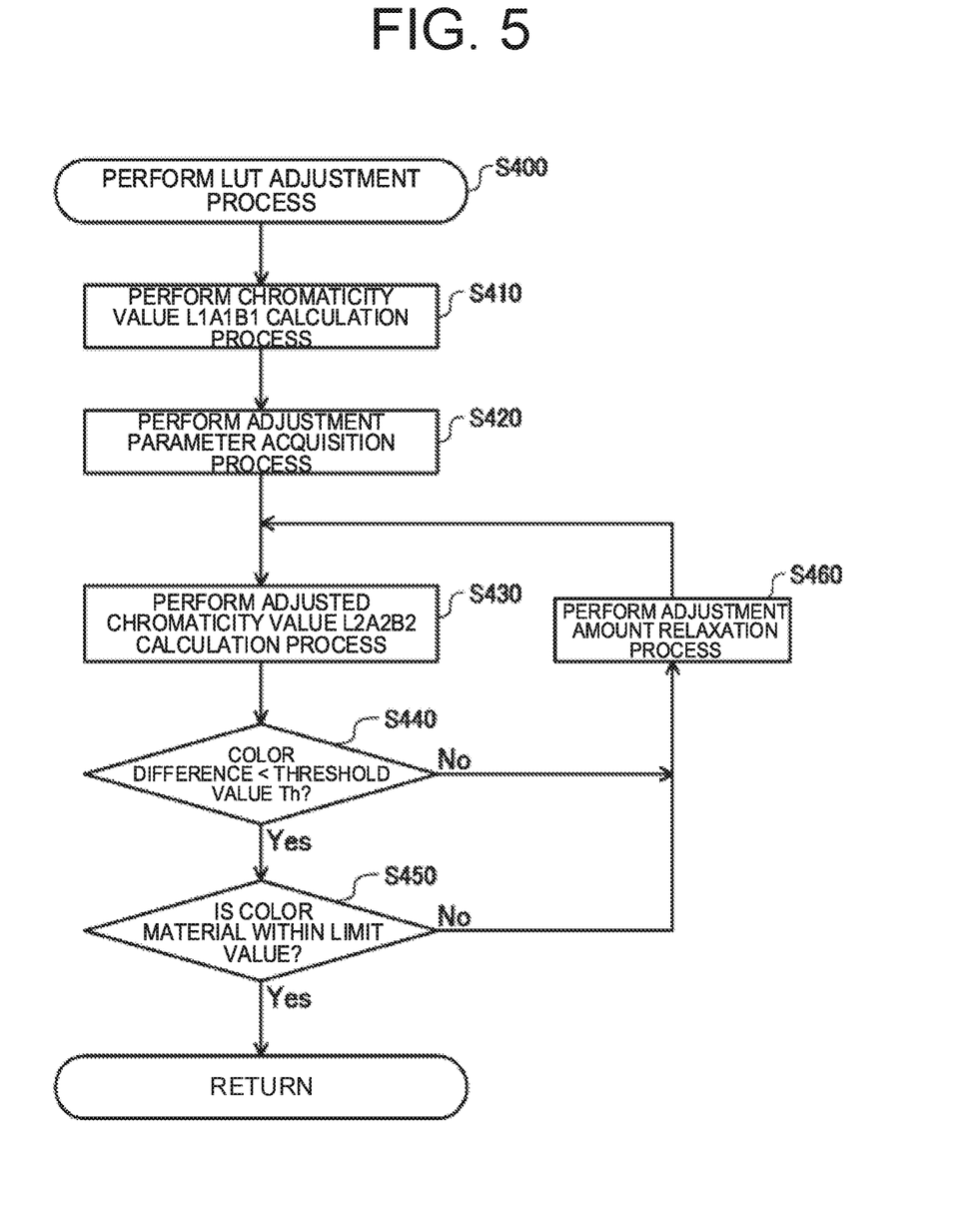
FIG. 5 is a flowchart illustrating the contents of an LUT adjustment process according to the embodiment.

FIG. 5 is a flowchart illustrating the contents of the LUT adjustment process (Step S400) according to the embodiment. In Step S410, the profile adjustment unit 111 calculates a Lab value (chromaticity value L1A1B1 in this example) of the color of the image area surrounded by the window W from the image data of the print job being temporarily saved. The Lab value is calculated by using the input profile 1411.

In Step S420, the profile adjustment unit 111 performs an adjustment parameter acquisition process. In the adjustment parameter acquisition process, the profile adjustment unit 111 accepts user input representing the adjustment content as an adjustment parameter from the user via the operation display unit 130. The user input includes, for example, increasing/decreasing of gradation values of the color materials used for image formation as the adjustment content. In this example, it is assumed that the user input includes the content indicating that the gradation value of Y is decreased to a target value of 98%. The adjustment content includes the type of color material to be adjusted and the direction of increase/decrease. The user input may be included, for example, in the print job on the personal computer 200 without going through the operation display unit 130.

In Step S430, the profile adjustment unit 111 decreases the gradation value of Y to 98% ($\alpha$=0.98) at the chromaticity value L1A1B1. That is, the profile adjustment unit 111 multiplies the Y gradation value of the CMYK image data corresponding to the chromaticity value L1A1B1 by $\alpha$, and adjusts at least one of the CMK gradation values to calculate the adjusted chromaticity value L2A2B2.

In Step S440, the color difference calculation unit 112 calculates a color difference $\Delta E$ before and after the adjustment, and determines whether or not the color difference $\Delta E$ is smaller than a preset threshold value Th. The color difference $\Delta E$ is calculated as a difference between two Lab values (for example, a Euclidean distance), one of the two Lab values being a Lab value of image data (also called a third image data) obtained by generating unadjusted image data, which is image data obtained by color-converting the image data of the print job by using the unadjusted device link profile, and then color-converting the unadjusted image data by using the simulation profile, and the other Lab value being a Lab value of image data (also called a third image data) obtained by generating adjusted image data, which is image data obtained by color-converting the image data of the print job by using the adjusted device link profile, and then color-converting the adjusted image data by using the simulation profile.

The color difference may be calculated as a difference between the Lab value generated by color-converting the image data of the print job by using the input profile 1411 and the Lab value of the adjusted image data. The color difference $\Delta E$ only needs to be calculated on the basis of image data generated by generating the adjusted image data, which is image data color-converted by using the adjusted device link profile or the output profile, and then color-converting the adjusted image data by using the simulation profile.

The profile adjustment unit 111 advances the process to Step S450 when the color difference $\Delta E$ before and after the adjustment is smaller than the threshold value Th, and the profile adjustment unit 111 advances the process to Step S460 when the color difference $\Delta E$ before and after the adjustment is equal to or greater than the threshold value Th.

In Step S450, the profile adjustment unit 111 determines whether or not the use of the color material is within a limit value. When the use of the color material is within the color material limit value, the profile adjustment unit 111 advances the process to Step S500 (see FIG. 2), and when the use of the color material is not within the color material limit value, the profile adjustment unit 111 advances the process to Step S460. The color material limit value is, for example, a total amount limit when the color material is toner or an ink duty limit when the color material is ink.

In Step S460, the profile adjustment unit 111 performs an adjustment amount relaxation process. In the adjustment amount relaxation process, the profile adjustment unit 111 relaxes an adjustment amount $\alpha$ by a preset step value. In this example, the profile adjustment unit 111 relaxes an $\alpha$ of 0.98 to an $\alpha$ of 0.99. The control unit 110 advances the process to Step S500 in response to the completion of the device link profile (LUT) adjustment process (Step S400).

In Step S500, the profile adjustment unit 111 performs the printing process by using the adjusted LUT and the unadjusted LUT, and outputs a printed matter P3 (see FIG. 4C). The printed matter P3 includes a printed image Gb (also called an unadjusted image) printed by using the unadjusted LUT, and a printed image Ga (also called the adjusted image) printed by using the adjusted LUT.

The printed image Gb includes the two image objects G2 and G3 printed by using the unadjusted LUT. The printed image Ga includes two image objects G2a and G3a printed by using the adjusted LUT. The user can compare the two image objects G2 and G3 with the two image objects G2a and G3a, and confirm whether the image is reproduced as an intended image (such as graininess and other dot formation state).

In Step S600, the control unit 110 displays, on the operation display unit 130, a screen (not illustrated) for allowing the user to confirm whether or not the image intended by the user is reproduced. For example, the control unit 110 advances the process to Step S700 in accordance with the user input of OK, and returns the process to the LUT adjustment process (Step S400) in accordance with the user input of NG.

In Step S700, the profile adjustment unit 111 performs a device link profile (LUT) update process. In the LUT update process, the profile adjustment unit 111 updates the respective gradation values of CMYK from the values before the adjustment to the values after the adjustment.

In Step S800, the control unit 110 performs a print job deletion process. In the print job deletion process, the control unit 110 deletes the temporarily saved print job from the storage unit 140.

As described above, the image forming apparatus 100 according to this embodiment can semi-automatically adjust the reproduction state of the dots with almost no color difference $\Delta E$ before and after the adjustment, that is, with almost no effect on a tint. The image forming apparatus 100 can print a plurality of (two in this example) printed images printed by using the LUT before and after the adjustment side by side on one sheet.

Consequently, the user can compare and evaluate both the printed images. Furthermore, the image forming apparatus 100 has an advantage that a new storage area is not required because the existing LUT is only adjusted without generation of a new LUT.

The present disclosure can be implemented not only in the above embodiment but also in the following modified examples.

Modification 1: The color difference $\Delta E$ is calculated in the Lab color space in the above embodiment, but the color space for calculating the color difference $\Delta E$ is not limited to the Lab color space. The color space for calculating the color difference $\Delta E$ only needs to be a color space for color difference comparison which is a common color space for comparing the color difference $\Delta E$. However, the Lab color space is a device-independent color space (CIE L*a*b* color space), and is designed to approximate human vision with an emphasis on perceptual uniformity. Therefore, there is an advantage that evaluation according to visual sensitivity of a human is possible.

Modification 2: The device link profile is the profile to be adjusted and updated in the above embodiment, but the output profile or both may be the profile to be adjusted and updated. The profile to be adjusted and updated is also called an adjustment target profile.

Modification 3: The image forming apparatus 100 is not equipped with a user login function in the above embodiment, but the present disclosure may use the user login function. Specifically, the image forming apparatus may allow the update of the adjustment target profile, for example, only when a user logs in. In this configuration, the image forming apparatus allows only a login user who logs in to update the adjustment target profile, associates the updated adjustment target profile with the login user, and stores the associated adjustment target profile in the storage unit. The color conversion processing unit can perform color conversion by using the updated adjustment target profile associated with the login user. On the other hand, a non-login user may be prohibited from updating the adjustment target profile, while the adjustment target profile may be adjusted to allow only temporary printing.

Alternatively, the image forming apparatus may increase the threshold value Th which is a reference for allowing the color difference ΔE, as compared with the non-login state, for example, when the user logs in. Consequently, the present disclosure allows users who log in to form dots according to the preference of each user, while image reproduction that is widely accepted by any user can be realized during non-login.

What is claimed is:

1. An image forming apparatus that forms an image on an image forming medium by using a plurality of coloring materials, the image forming apparatus comprising:
    a color conversion processing unit that has an input profile for color conversion to first image data which is image data of a device-independent color space, an adjustment target profile for color conversion to second image data which represents gradation values of the plurality of color materials, and a simulation profile for color-converting the second image data to third image data of the device-independent color space, and that performs a color conversion process;
    a profile adjustment unit that accepts user input representing adjustment content of the adjustment target profile, adjusts the adjustment target profile in accordance with the user input, determines whether or not a color difference before and after the adjustment of the adjustment target profile is smaller than a preset threshold value, and updates the adjustment target profile by using the adjustment target profile after the adjustment when the profile adjustment unit determines that the color difference is smaller than the threshold value;
    an image forming unit that forms an image on an image forming medium by using the plurality of coloring materials on the basis of the second image data; and
    a color difference calculation unit that generates adjusted image data which is image data color-converted by using the adjustment target profile after the adjustment, color-converts the adjusted image data by using the simulation profile to generate the third image data, and calculates the color difference as a difference in color before and after the adjustment of the adjustment target profile on the basis of the third image data.

2. The image forming apparatus according to claim 1, wherein
    the profile adjustment unit determines whether or not the adjusted image data is within a range of color gamut reproducible by the image forming unit, and when the adjusted image data is within the range of color gamut, the profile adjustment unit updates the adjustment target profile by using the adjustment target profile after the adjustment.

3. The image forming apparatus according to claim 1, further comprising:
    a storage unit; and
    an image reading unit, wherein
    the profile adjustment unit stores one set of image data in the storage unit,
    the image forming unit forms an image for area selection on the image forming medium on the basis of the one set of image data,
    the image reading unit reads the image for area selection formed on the image forming medium and a range selection image for selecting a part of the image for area selection drawn on the image forming medium, and generates reading image data,
    the profile adjustment unit detects a difference between an image represented by the one set of image data stored in the storage unit and an image represented by the read image data, detects the range selection image, and extracts an image area having an image substantially identical to the image in the range selected by the range selection image from the image for area selection, and
    forms, on an image forming medium, an image represented on the basis of the one set of image data in the extracted image area, and an image represented on the basis of the adjusted image data in the extracted image area.

4. The image forming apparatus according to claim 3, wherein
    the profile adjustment unit has a processing mode of limiting an adjustment range of the adjustment target profile to color of the image in the extracted image area, and a processing mode of setting the adjustment range of the adjustment target profile to an entire range of the adjustment target profile, and selects one of the processing modes in accordance with the user input, and adjusts and updates the adjustment target profile.

5. The image forming apparatus according to claim 1, comprising
    a control unit having a user login function that allows login to the image forming apparatus; and
    a storage unit that stores the adjustment target profile, wherein
    the control unit allows a login user who logs in to the image forming apparatus to update the adjustment target profile, associates the updated adjustment target profile with the login user, and stores the associated adjustment target profile, and
    the color conversion processing unit performs color conversion by using the updated adjustment target profile which is associated with the login user.

6. An image forming method for forming an image on an image forming medium by using a plurality of coloring materials, the image forming method comprising:
    a color conversion process having an input profile for color conversion to first image data which is image data of a device-independent color space, an adjustment target profile for color conversion to second image data which represents gradation values of the plurality of color materials, and a simulation profile for color-converting the second image data to third image data of the device-independent color space, and performing the color conversion;
    a profile adjustment process accepting user input representing adjustment content of the adjustment target profile, adjusting the adjustment target profile in accordance with the user input, determining whether or not a color difference before and after the adjustment of the adjustment target profile is smaller than a preset threshold value, and updating the adjustment target profile by using the adjustment target profile after the adjustment when it is determined that the color difference is smaller than the threshold value;
    an image forming process forming an image on an image forming medium by using the plurality of coloring materials on the basis of the second image data; and a color difference calculation process generating adjusted image data which is image data color-converted by using the adjustment target profile after the adjustment, color-converting the adjusted image data by using the simulation profile to generate the third image data, and calculating the color difference as a difference in color before and after the adjustment of the adjustment target profile on the basis of the third image data.

7. A computer-readable non-temporary recording medium storing an image-forming program that controls an image forming apparatus which forms an image on an image forming medium by using a plurality of coloring materials, wherein the image forming program causes the image forming apparatus to function as:

a color conversion processing unit that has an input profile for color conversion to first image data, which is image data of a device-independent color space, an adjustment target profile for color conversion to second image data which represents gradation values of the plurality of color materials, and a simulation profile for color-converting the second image data to third image data of the device-independent color space, and that performs a color conversion process;

a profile adjustment unit that accepts user input representing adjustment content of the adjustment target profile, adjusts the adjustment target profile in accordance with the user input, determines whether or not a color difference before and after the adjustment of the adjustment target profile is smaller than a preset threshold value, and updates the adjustment target profile by using the adjustment target profile after the adjustment when the profile adjustment unit determines that the color difference is smaller than the threshold value;

an image forming unit that forms an image on an image forming medium by using the plurality of coloring materials on the basis of the second image data; and a color difference calculation unit that generates adjusted image data which is image data color-converted by using the adjustment target profile after the adjustment, color-converts the adjusted image data by using the simulation profile to generate the third image data, and calculates the color difference as a difference in color before and after the adjustment of the adjustment target profile on the basis of the third image data.

* * * * *